(12) United States Patent
Han et al.

(10) Patent No.: US 10,120,231 B2
(45) Date of Patent: Nov. 6, 2018

(54) LIQUID CRYSTAL DISPLAY

(71) Applicant: LG Display Co., Ltd., Seoul (KR)

(72) Inventors: Sangdae Han, Gyeonggi-do (KR); Sejeon Park, Gyeonggi-do (KR); Gunwoo Lee, Gangwon-do (KR)

(73) Assignee: LG Display Co., Ltd., Seoul (KR)

( * ) Notice: Subject to any disclaimer, the term of this patent is extended or adjusted under 35 U.S.C. 154(b) by 0 days.

(21) Appl. No.: 15/393,701

(22) Filed: Dec. 29, 2016

(65) Prior Publication Data

US 2018/0188589 A1 Jul. 5, 2018

(51) Int. Cl.
*G02F 1/1335* (2006.01)

(52) U.S. Cl.
CPC .. *G02F 1/133504* (2013.01); *G02F 1/133528* (2013.01); *G02F 2202/28* (2013.01)

(58) Field of Classification Search
CPC ......... G02F 1/133504; G02F 1/133528; G02F 1/133606; G02F 1/1333; G02F 1/133617; G02F 1/133526; G02F 1/133611; G02F 1/133; G02F 2001/133607; G02F 2001/133507; G02F 2202/28; G02F 2201/50; G02B 5/0242; G02B 5/0268; G02B 5/0231; G02B 5/0236; G02B 5/0247; G02B 5/02; G02B 5/305; G02B 5/0221; G02B 5/0263; G02B 5/3025; G02B 5/30; G02B 5/226; G02B 6/0051; G02B 6/0053; G02B 6/0016; G02B 6/0025; G02B 6/0038; G02B 1/04; G02B 1/10; G02B 1/111; B32B 2307/412; B32B 2307/42; B32B 7/12; B32B 2457/202; B32B 2457/20; B32B 27/08; B32B 2551/00; B32B 37/1284

USPC .......... 349/64, 96, 65, 61, 62, 122; 359/599; 362/97.1, 97.2, 355

See application file for complete search history.

(56) References Cited

U.S. PATENT DOCUMENTS

| | | | | |
|---|---|---|---|---|
| 2005/0253923 A1* | 11/2005 | Komori | ............... | H04M 1/0264 348/14.02 |
| 2007/0134438 A1* | 6/2007 | Fabick | .................... | B32B 27/08 428/1.1 |
| 2009/0296024 A1* | 12/2009 | Kanaya | .................. | B32B 27/30 349/64 |

* cited by examiner

*Primary Examiner* — Thoi Duong (74) *Attorney, Agent, or Firm* — Morgan, Lewis & Bockius LLP

(57) ABSTRACT

A liquid crystal display (LCD) is disclosed. The liquid crystal display (LCD) comprises an LCD panel, an upper polarization plate over the LCD panel, a lower polarization plate under the LCD panel, an adhesive layer under the lower polarization plate, a diffusion sheet under the adhesive layer, and an irregular air layer between at least part of the adhesive layer and the diffusion sheet.

8 Claims, 10 Drawing Sheets

| Classification | Comparative example | Third embodiment | First embodiment |
|---|---|---|---|
| Structure | LPOL, AD, BD, RL, BS (DIF) | LPOL, UAD, BD', RL, BS (DIF) | LPOL, UAD, IPP, RL, BS (DIF) |
| Brightness | 100% | 108.0% | 105.7% |
| Light Profile | | | |
| Peak Angle | 31° | 7° | 6° |
| Shield power (FOS) | Spot and white point viewed | Spot and white point phenomena improved | |

FIG. 18

| Classification |  |  |  |  |  |
|---|---|---|---|---|---|
| Air Gap | 5μm | 4μm | 3μm | 2μm | 1μm |
| Brightness | 107.5% | 105.7% | 103.2% | 102% | 100% |
| Peel strength (180°) | 10gf | 30gf | 54 | 71 | 85 |
| Shield power (FOS) | Strong | Strong | Middle strong | Middle | Weak |

LIQUID CRYSTAL DISPLAY

BACKGROUND

Field of the Invention

The present disclosure relates to a liquid crystal display and, more particularly, to a liquid crystal display having an optical film on a lower polarization plate for providing uniformity and condensing backlight from a backlight unit.

Discussion of the Related Art

Applications of liquid crystal displays have tended to increase due to their typical characteristics, such as light weight, a thin type, and low consumption power driving. A liquid crystal display is often used in portable computers, such as notebook PCs, office automation devices, audio/video devices, and indoor and outdoor advertising displays. A transmission type liquid crystal display, which is a common type of liquid crystal display, displays an image by modulating light incident from a backlight unit through control of an electric field applied to a liquid crystal layer.

The backlight unit may be basically divided into a direct type and an edge type. The direct type backlight unit typically has a structure in which a plurality of light sources is disposed under a liquid crystal display panel. The edge type backlight unit typically has a structure in which a light source is disposed to face the side of a light guide plate, and a plurality of optical films is disposed between a liquid crystal display panel and the light guide plate. In the edge type backlight unit, the light source radiates light to one side of the light guide plate, and the light guide plate converts a line light source or a dot light source into a surface light source. The edge type backlight unit has an advantage in that it may be implemented with a thickness less than that of a direct type backlight unit.

Figure 1:
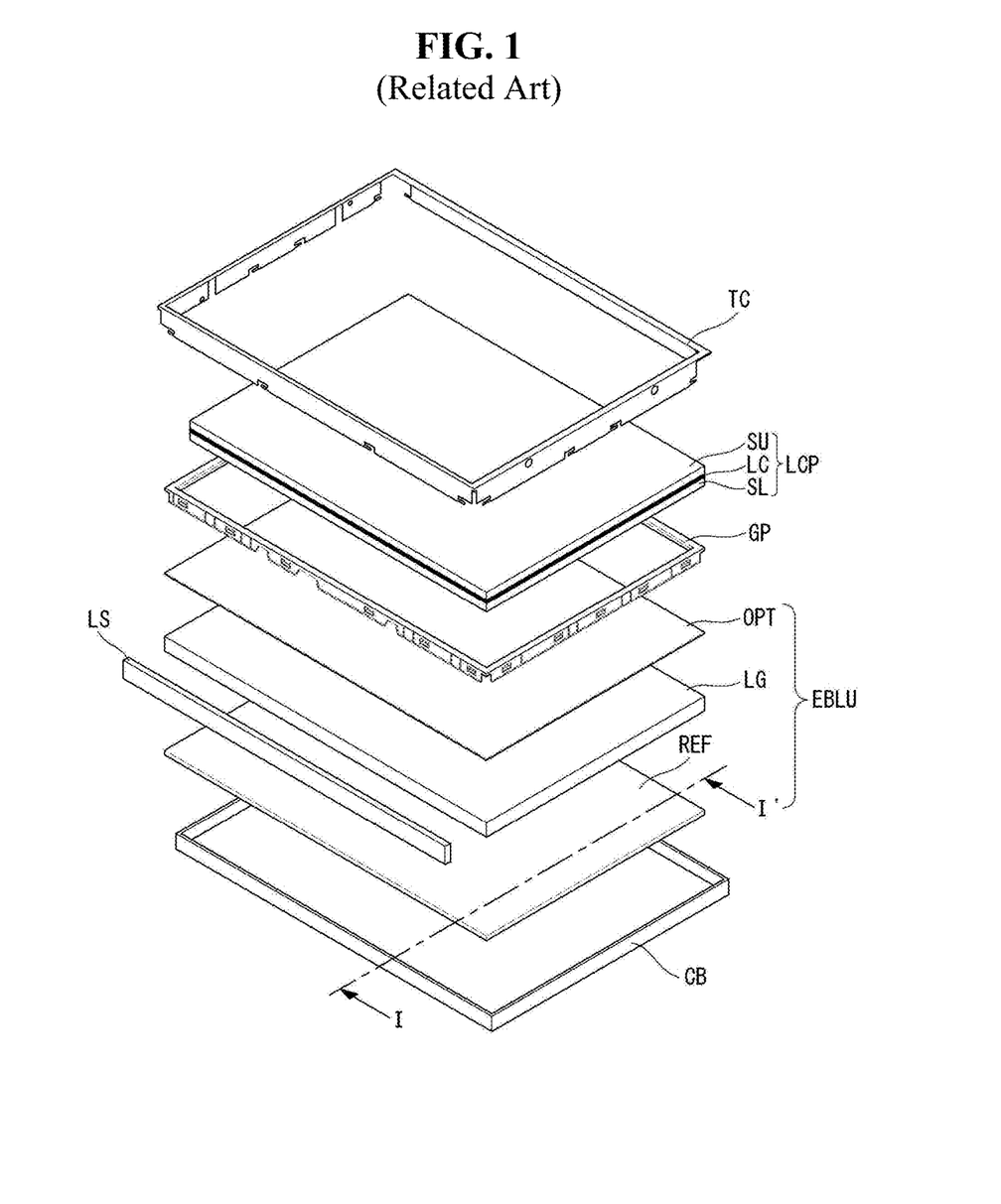
FIG. 1 is an exploded perspective view showing the structure of a liquid crystal display including an edge type backlight unit according to the related art.
Figure 2:
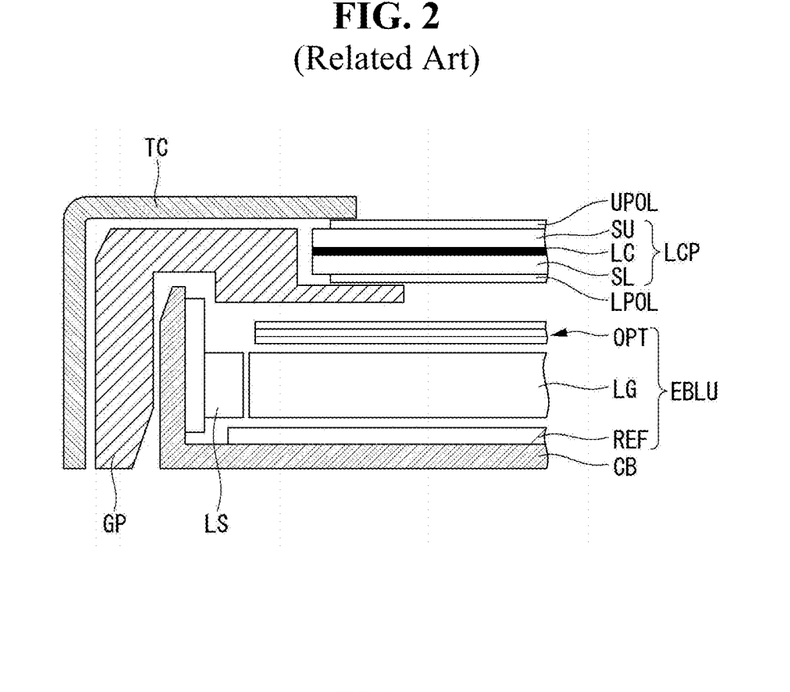
FIG. 2 is a cross-sectional view showing the structure of the liquid crystal display including an edge type backlight unit according to the related art, which is taken along line I-I' of FIG. 1.

A liquid crystal display including an edge type backlight unit according to the related art is described with reference to FIGS. 1 and 2. FIG. 1 is an exploded perspective view showing the structure of the liquid crystal display including an edge type backlight unit according to the related art. FIG. 2 is a cross-sectional view showing the structure of the liquid crystal display including an edge type backlight unit according to the related art, which is taken along line I-I' of FIG. 1.

With reference to FIGS. 1 and 2, the liquid crystal display according to the related art includes a liquid crystal display panel LCP and an edge type backlight unit EBLU disposed under the liquid crystal display panel LCP. The liquid crystal display panel LCP has a liquid crystal layer LC formed between an upper glass substrate SU and a lower glass substrate SL, and may be implemented in any liquid crystal mode.

The edge type backlight unit EBLU includes a light source LS, a light guide plate LG, and an optical sheet (film(s)) OPT. The edge type backlight unit EBLU converts light, output by the light source LS, into a uniform surface light source through the light guide plate LG and the optical film(s) OPT and provides the converted uniform surface light source to the liquid crystal display panel LCP. Furthermore, a reflection plate REF for returning light that leaks through the bottom of the light guide plate LG to the light guide plate LG may be further provided under the light guide plate LG.

A cover bottom CB is disposed under the reflection plate REF. The cover bottom CB may have a bowl shape in which the edge type backlight unit EBLU is received. Furthermore, the cover bottom CB includes a material having high thermal conductivity and high stiffness so that heat from the light source LS can be smoothly discharged to the outside. For example, the cover bottom CB may be fabricated using a metal plate, such as aluminum, aluminum nitride (AlN), an electronic galvanized steel sheet (EGI), stainless steel (SUS), Galvalume (SGLC), an aluminized steel sheet (so-called ALCOSTA), or a tin plate steel sheet (SPTE). Furthermore, the metal plate may be coated with a high conductivity material for accelerating thermal transfer.

A guide panel GP and the top case TC are disposed at the edge of the liquid crystal display panel LCP. The guide panel GP has a rectangular mold frame in which glass fiber is mixed in synthetic resin, such as polycarbonate. The guide panel GP surrounds the top edge and sides of the liquid crystal display panel LCP and surrounds the sides of the edge type backlight unit EBLU. The guide panel GP supports the liquid crystal display panel LCP and regularly maintains the interval between the liquid crystal display panel LCP and the optical sheet OPT. The top case TC is made of a metal material, such as a zinc plate steel sheet, and has a structure that surrounds the top and sides of the guide panel GP. The top case TC is fixed to at least one of the guide panel GP and the cover bottom CB by a hook or screw.

A light-emitting device having high brightness with low power, like an LED, may be used as the light source LS. The light source LS supplies light to the light guide plate LG. In the edge type backlight unit EBLU, the light source LS is located at the side of the liquid crystal display panel LCP. That is, the light source LS supplies light to a side of the light guide plate LG in accordance with at least one side of the light guide plate LG.

The light guide plate LG has a panel type rectangular parallelepiped shape having a face corresponding to the area of the liquid crystal display panel LCP. The top surface of the light guide plate LG faces the liquid crystal display panel LCP. The light guide plate LG functions to receive light from the light source LS installed on the side of the light guide plate LG, to diffuse and distribute the light therein so that the light is uniformly distributed within the light guide plate LG, and to guide the light to the top surface in which the liquid crystal display panel LCP has been disposed.

The light guided to the liquid crystal display panel LCP by the light guide plate LG may not be suitable for being used as backlight. For example, the light may not have a uniform brightness distribution over the entire area of the liquid crystal display panel LCP. Alternatively, the light may not have been concentrated in a viewer direction with respect to a surface of the liquid crystal display panel LCP. Accordingly, in order for the light to be entirely used as backlight, it may be necessary to concentrate and diffuse the light.

Figure 3:
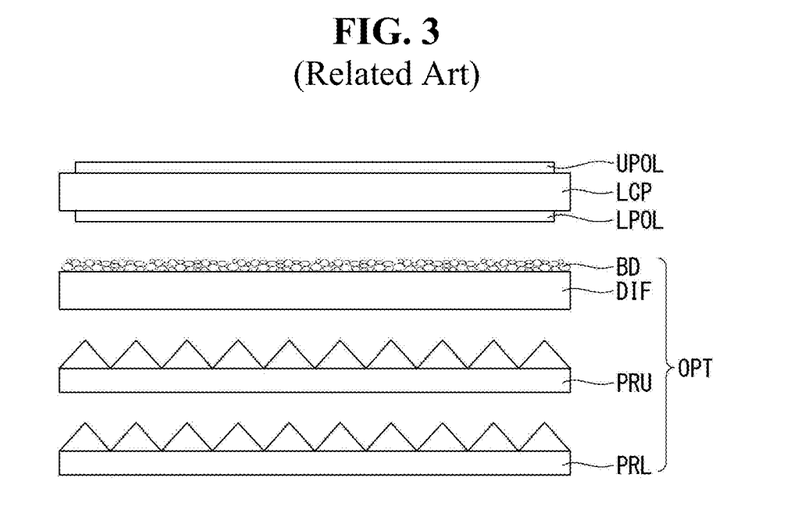
FIG. 3 is a cross-sectional view showing the structure of optical films including a diffusion film in a liquid crystal display according to the related art.

For such a function, the optical film OPT is disposed between the light guide plate LG and the liquid crystal display panel LCP. The structure of the optical films OPT according to a related art technology is described below with reference to FIGS. 3 and 4. FIG. 3 is a cross-sectional view showing the structure of optical films including a diffusion film in a liquid crystal display according to the related art.

The optical films OPT disposed under the liquid crystal display panel LCP of FIG. 3 have a stack structure which is widely used. For example, the optical films OPT may have a structure in which a lower prism sheet PRL, an upper prism sheet PRU, and a diffusion sheet DIF have been sequentially stacked.

Trigonal prism patterns are disposed in parallel on the top surface of the lower prism sheet PRL. For example, a concave mountain portion and a convex valley portion are alternately disposed on the lower prism sheet PRL. Pointed mountain portions are arranged in parallel in a first direction. The upper prism sheet PRU may also have the same prism pattern as the lower prism sheet PRL. In this case, the tops of the upper prism sheet PRU are disposed in parallel in a second direction orthogonal to the first direction. Light emitted from the light guide plate LG is concentrated in the form of a Gaussian distribution with respect to a normal line for the surface of the liquid crystal display panel LCP, while passing through the lower prism sheet PRL and the upper prism sheet PRU.

The diffusion sheet DIF functions to distribute pieces of light passing through the prism sheets PRL and RPU so that the pieces of light have a uniform brightness distribution over the entire surface of the liquid crystal display panel LCP. For example, in the case of the edge type backlight unit, a side face in which the light source is placed may have brighter brightness than a side face opposite the side face in which the light source is placed. Furthermore, in the case of the direct type backlight unit, a portion in which the light source is placed may have brighter brightness than the surrounding portion of the light source. The diffusion sheet DIF functions to uniformly diffuse a brightness distribution of light that is not uniform with respect to the entire surface of the liquid crystal display panel LCP. For such a diffusion function, beads BD may have been distributed to the top surface of the diffusion sheet DIF.

Figure 4:
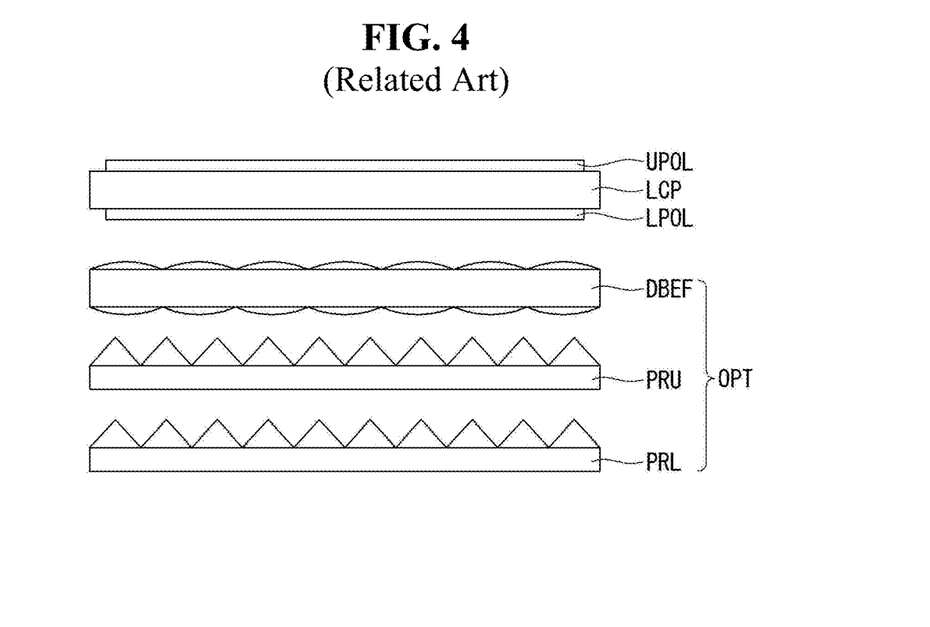
FIG. 4 is a cross-sectional view showing the structure of optical films including a high brightness diffusion film in a liquid crystal display according to the related art.

Light becomes suitable for being used as backlight by the prism sheets PRL and PRU and the diffusion sheet DIF, but there may be a problem in that brightness is deteriorated while the light passes through the optical films. This may deteriorate the energy efficiency for generating the backlight. For example, brightness is significantly reduced due to the diffusion sheet DIF. In order to solve such a problem, there has been proposed a high brightness diffusion film DBEF. FIG. 4 is a cross-sectional view showing the structure of optical films including a high brightness diffusion film DBEF in a liquid crystal display according to the related art.

The high brightness diffusion film DBEF has a high refraction layer and a low refraction layer stacked thereon, and thus solves a problem in that brightness is reduced by reflecting light lost by reflection to its top surface again. FIG. 4 has the same structure as FIG. 3 except that the high brightness diffusion film DBEF has been disposed instead of the diffusion film DIF.

As described above, the optical films according to the related art have a structure in which they have been sequentially stacked between the liquid crystal display panel LCP and the light guide plate LG. That is, the upper prism sheet PRU is disposed on the lower prism sheet PRL in the lay-down state. Accordingly, a specific air layer is present between the upper prism sheet PRU and the lower prism sheet PRL. The air layer has a refractive index different from that of the prism sheets PRL and RPU, and thus an effect that pieces of light passing through the prism sheets PRL and RPU are diffused can be obtained.

Likewise, the diffusion film DIF or the high brightness diffusion film DBEF are also disposed on the upper prism sheet PRU in the lay-down state. Accordingly, an air layer is present between the upper prism sheet PRU and the diffusion film DIF, or between the upper prism sheet PRU and the high brightness diffusion film DBEF. Thus, an effect that pieces of light are diffused while passing through the air layers can be obtained.

However, the thickness increases due to the structure in which the optical films OPT are simply stacked, which becomes an obstacle to the thinness of a liquid crystal display. An attempt is made to make the optical films ultra-thin by laminating them. If the optical films are simply laminated, however, an air layer disappears. If the air layer disappears, a brightness distribution becomes irregular because a diffusion effect according to the air layer cannot be obtained. Furthermore, a Moire pattern, a rainbow Mura pattern, or a pattern of a hot-spot form is generated. Such irregular brightness and/or generation of a pattern may be significant enough such that the light cannot be suitably used as backlight. This problem prevents a liquid crystal display from becoming ultra-thin.

SUMMARY

Accordingly, embodiments of the present disclosure are directed to providing an ultra-thin liquid crystal display with which an optical film has been integrated that substantially obviates one or more problems due to limitations and disadvantages of the related art.

An object of the present disclosure is to provide an ultra-thin liquid crystal display capable of improving the light condensing of a diffusion sheet and reliability of a diffusion characteristic by forming an air layer between a lower polarization plate and the diffusion sheet.

Another object of the present disclosure is to provide an ultra-thin liquid crystal display with which an optical film has been integrated by laminating a lower polarization plate and a diffusion sheet.

Another object of the present disclosure is to provide an ultra-thin liquid crystal display in which a brightness irregularity problem and/or rainbow Mura is not generated in a structure in which a liquid crystal display panel and an optical film have been laminated.

Additional advantages and features of the invention will be set forth in part in the description which follows and in part will become apparent to those having ordinary skill in the art upon examination of the following or may be learned from practice of the invention. The objectives and other advantages of the invention may be realized and attained by the structure particularly pointed out in the written description and claims hereof as well as the appended drawings.

To achieve these and other advantages and in accordance with the purpose of the invention, as embodied and broadly described herein, a liquid crystal display (LCD) comprises an LCD panel, an upper polarization plate over the LCD panel, a lower polarization plate under the LCD panel, an adhesive layer under the lower polarization plate, a diffusion sheet under the adhesive layer, and an irregular air layer between at least part of the adhesive layer and the diffusion sheet.

It is to be understood that both the foregoing general description and the following detailed description are exemplary and explanatory and are intended to provide further explanation of the invention as claimed.

BRIEF DESCRIPTION OF THE DRAWINGS

The accompanying drawings, which are included to provide further understanding of the disclosure and are incorporated in and constitute a part of this specification, illustrate embodiments of the disclosure and together with the description serve to explain the principles of the disclosure. In the drawings.

DETAILED DESCRIPTION

Reference will now be made in detail to embodiments, examples of which are illustrated in the accompanying drawings. The same or like reference numbers may be used throughout the drawings to refer to the same or like parts.

Hereinafter, some embodiments of the present disclosure are described in detail with reference to the accompanying drawings. In the specification, the same reference numerals denote the same elements. In the following description, a detailed description of the known functions and constitutions will be omitted if it is deemed to make the gist of the present disclosure unnecessarily vague. Furthermore, the names of elements used in the following description have been selected by taking into consideration only the ease of writing this specification and may be different from the names of actual parts.

First Embodiment

Figure 5:
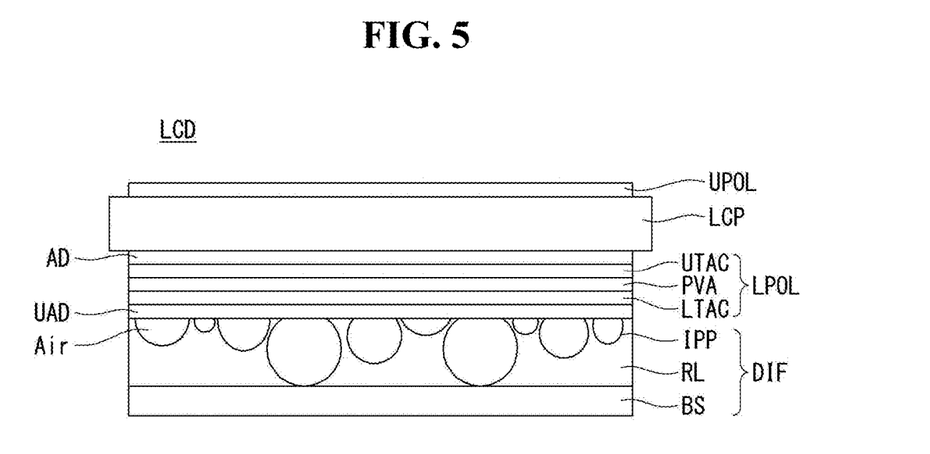
FIG. 5 is a cross-sectional view showing the structure of a liquid crystal display in which a diffusion sheet is laminated with a lower polarization plate according to a first embodiment of the present disclosure.
Figure 6:
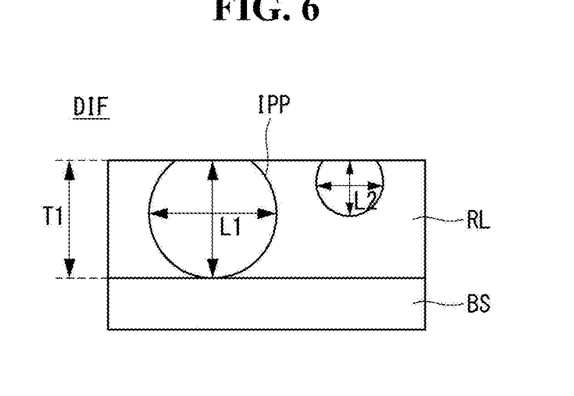
FIG. 6 is a cross-sectional view showing the structure of the diffusion sheet according to the first embodiment of the present disclosure.
Figure 7:
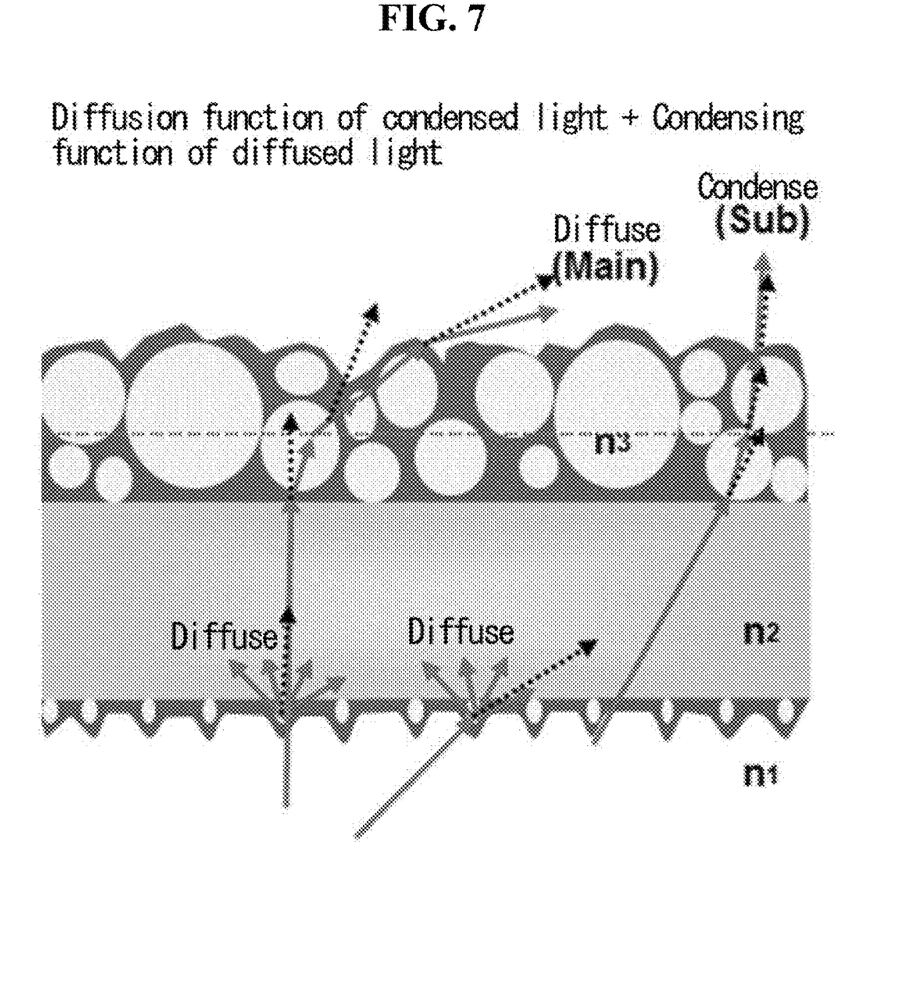
FIG. 7 is a diagram showing light-condensing and diffused light when an air layer is present over the diffusion sheet.
Figure 8:
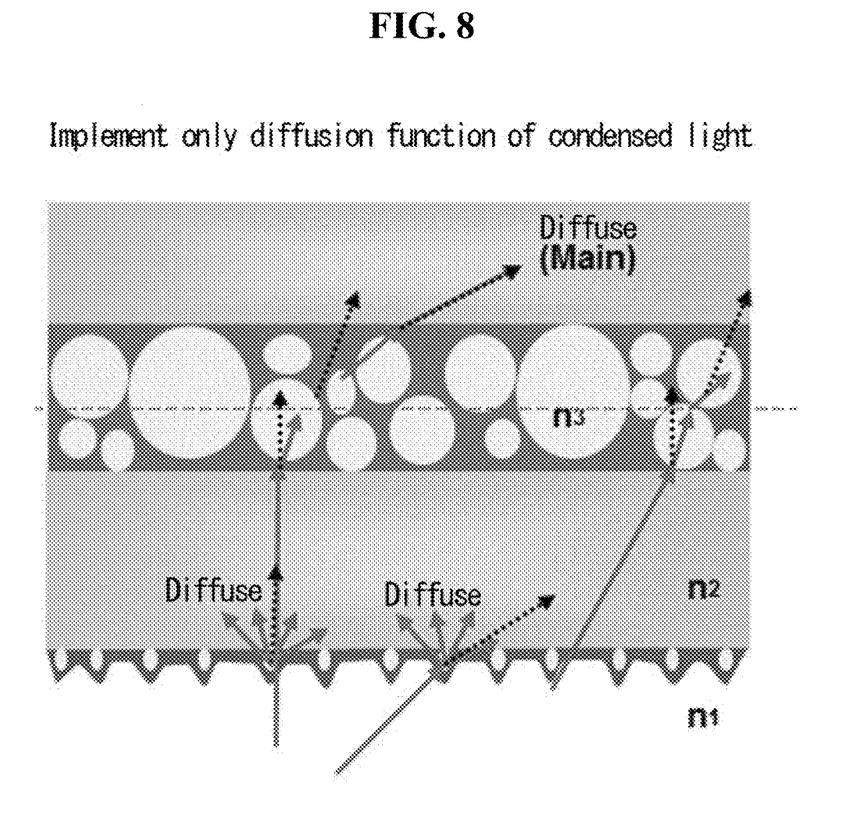
FIG. 8 is a diagram showing diffused light when an air layer is not present over the diffusion sheet.
Figure 9:
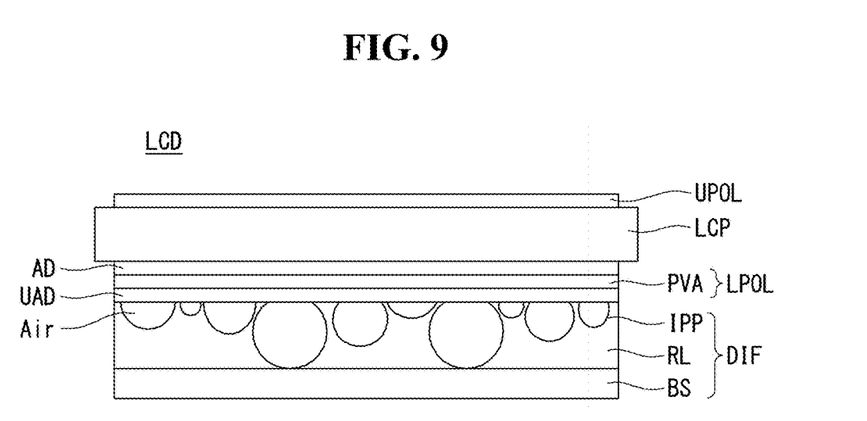
FIG. 9 is a cross-sectional view showing a structure of the liquid crystal display according to the first embodiment of the present disclosure.
Figure 10:
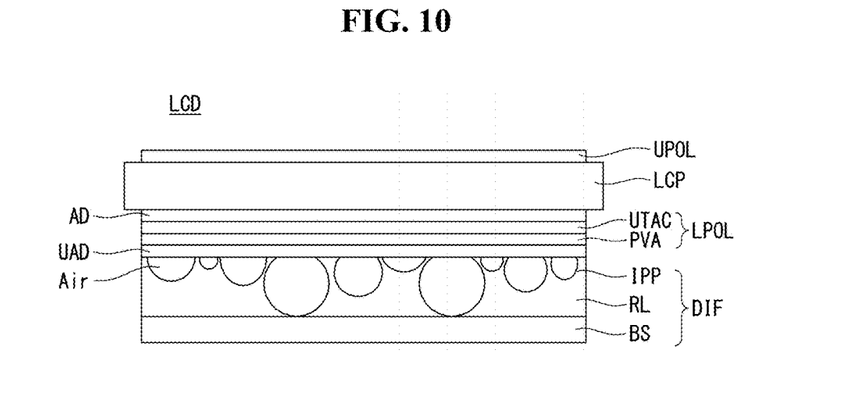
FIG. 10 is a cross-sectional view showing a structure of the liquid crystal display according to the first embodiment of the present disclosure.
Figure 11:
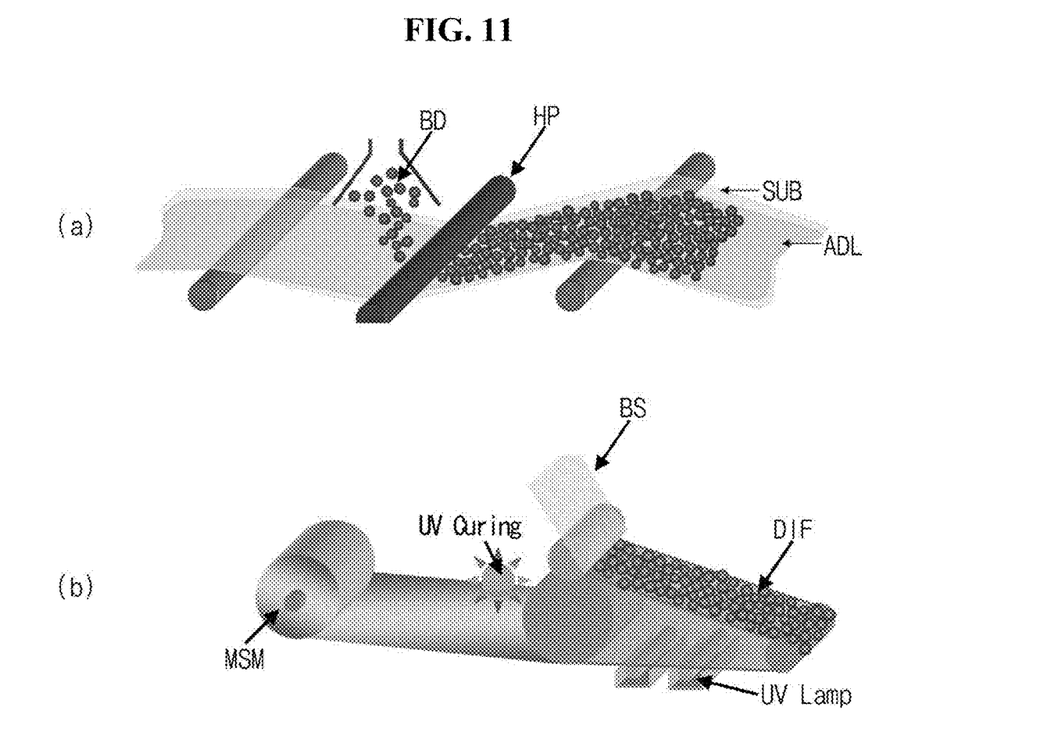
FIG. 11 is a process diagram showing the liquid crystal display according to the first embodiment of the present disclosure.

The first, example embodiment of the present disclosure is described below with reference to FIGS. 5 to 11. FIG. 5 is a cross-sectional view showing the structure of a liquid crystal display in which a prism sheet is laminated with a lower polarization plate according to the first embodiment of the present disclosure. FIG. 6 is a cross-sectional view showing the structure of the diffusion sheet according to the first embodiment of the present disclosure. FIG. 7 is a diagram showing light-condensing and diffused light when an air layer is present over the diffusion sheet. FIG. 8 is a diagram showing diffused light when an air layer is not present over the diffusion sheet. FIG. 9 is a cross-sectional view showing a structure of the liquid crystal display according to according to the first embodiment of the present disclosure. FIG. 10 is a cross-sectional view showing a structure of the liquid crystal display according to the first embodiment of the present disclosure. FIG. 11 is a process diagram showing the liquid crystal display according to the first embodiment of the present disclosure.

With reference to FIG. 5, the liquid crystal display (hereinafter referred to as the "LCD") according to the first embodiment of the present disclosure includes an LCD panel LCP, an upper polarization plate UPOL, a lower polarization plate LPOL, and a diffusion sheet DIF.

The LCD panel LCP includes an upper substrate and a lower substrate surface coalesced with a liquid crystal layer interposed therebetween. The upper polarization plate UPOL has coalesced on the top surface of the LCD panel LCP. The lower polarization plate LPOL, with which the diffusion sheet DIF has been laminated, has coalesced on the bottom surface of the LCD panel LCP.

The upper polarization plate UPOL has light transmission axes or light blocking axes aligned in a first direction. The lower polarization plate LPOL has light transmission axes or light blocking axes aligned in a second direction. For an LCD that is normally black, a first light transmission axis and a second light transmission axis may be disposed to be orthogonal to each other. In contrast, for an LCD that is normally white, the first light transmission axis and the second light transmission axis may be disposed in parallel.

The lower polarization plate LPOL includes a polarizer PVA, and an upper protection layer UTAC and a lower protection layer LTAC coalesced on both surfaces of the polarizer PVA. For example, the polarizer PVA may deform due to moisture included in the air. In order to prevent such a problem, the upper protection layer UTAC and the lower protection layer LTAC have coalesced on both surfaces of the polarizer PVA. The lower polarization plate LPOL adheres to the LCD panel LCP through an adhesive layer AD.

The diffusion sheet DIF has been laminated on the bottom surface of the lower polarization plate LPOL through a UV adhesive layer UAD. The diffusion sheet DIF includes a resin layer RL having engraved patterns IPP formed on a base sheet BS.

The base sheet BS functions to transmit light incident from a light source and to protect the resin layer RL. To this end, the base sheet BS may be made of a material that can transmit light incident from the light source and that has a great resistance against moisture in the air. For example, the material may be any one selected from the group consisting of polyethylene terephthalate (PET), polycarbonate (PC), polypropylene (PP), polyethylene (PE), polystyrene (PS), and polyepoxy (PE), but is not limited thereto. The base sheet BS may be formed to have a thin thickness in accordance with the thinness of a backlight unit—for example, a thin thickness of 10 μm to 250 μm. If the base sheet BS is formed to have a thickness of 10 μm or more, the backlight unit may be made as thin as possible within the limits of not deteriorating the mechanical physical and heat-resistant properties of an optical film. Furthermore, if the base sheet BS is formed to have a thickness of 250 μm or less, a thin backlight unit may be achieved, and the mechanical physical and heat-resistant properties of the optical film may be maximized.

The resin layer RL is placed on the base sheet BS, and its engraved patterns IPP may condense and diffuse light incident from the light source by its engraved patterns IPP. The resin layer RL may be made of transparent polymer resin so as to transmit light incident from the light source. In such an example, the polymer resin may be any one selected from the group consisting of acryl, polycarbonate, polypropylene, polyethylene, and polyethylene terephthalate.

With reference to FIG. 6, the plurality of engraved patterns IPP is formed on the surface of the resin layer RL. The plurality of engraved patterns IPP includes air layers Air because the resin layer RL adheres to the UV adhesive layer UAD (see FIG. 5). Each of the plurality of engraved patterns IPP may have a globular shape that is partially cut; for example, an upper part of the globular shape may be cut. The plurality of engraved patterns IPP may have various lengths. In such an example, the length of the engraved patterns IPP refers to the length of a Y-axis direction that extends in a direction vertical to the LCD panel LCP on the basis of the base sheet BS and the length of an X-axis direction that crosses the Y axis at a right angle. The length of the engraved patterns IPP in the Y-axis direction may be a vertical length from the UV adhesive layer UAD to the resin layer RL, or a vertical length from the UV adhesive layer UAD to the base sheet BS not including the resin layer RL. Each of lengths L1 and L2 of the engraved pattern IPP may be at least 1 μm or more. For example, each of the lengths L1 and L2 of the engraved pattern IPP may be 1 to 30 μm. If each of the lengths L1 and L2 of the engraved pattern IPP is 1 μm or more, the space in which the air layer Air may be present is formed in the internal space of the engraved pattern IPP. Accordingly, light incident to the resin layer RL meets the air layer Air and is refracted at the interface of the resin layer RL and the engraved pattern IPP, thereby being capable of condensed and diffused. Furthermore, if each of the lengths L1 and L2 of the engraved pattern IPP is 30 μm or less, a thin diffusion sheet DIF can be formed because an increase in the thickness of the resin layer RL may be prevented. Furthermore, the lengths L1 and L2 of contiguous engraved patterns IPP may have a difference of at least 1 μm or more. Accordingly, light-condensing and diffusion effects can be improved because a point of time at which light is condensed and a point of time at which the light is diffused are different.

Furthermore, the plurality of engraved patterns IPP may overlap and may be spaced apart from each other. In at least one of the plurality of engraved patterns IPP, the length of the entrance of the corresponding engraved pattern IPP, e.g., the length of an interface between the corresponding engraved pattern IPP and the UV adhesive layer UAD, may be smaller than a maximum length of the corresponding engraved pattern IPP. The reason for this is that the resin layer RL may contract during the process of curing the resin layer RL after the engraved patterns IPP are stamped out in a process of forming the engraved patterns IPP. However, the present disclosure is not limited thereto. The engraved patterns IPP having various lengths and shapes may be formed using known methods.

In an example, the resin layer RL has a thickness T1 of 1 to 100 μm in order to facilitate the formation of the plurality of engraved patterns IPP. The thickness T1 of the resin layer RL is formed to not exceed 100 μm in order to prevent brightness of a light source from being deteriorated.

With reference back to FIG. 5, the diffusion sheet DIF including the plurality of engraved patterns IPP is laminated on the lower polarization plate LPOL through the UV adhesive layer UAD and integrated with the LCD panel LCP. An LCD having a thinner thickness than a related art LCD can be provided by integrating this diffusion sheet DIF having a diffusion function with the lower polarization plate LPOL.

If the diffusion sheet DIF, in which the plurality of engraved patterns IPP has been formed, is laminated on the lower polarization plate LPOL as in the first embodiment of the present disclosure, the diffusion sheet DIF may be disposed very close to the LCD panel LCP. There may be an increased possibility that a pattern failure attributable to brightness irregularity may occur, because an air layer present between a diffusion film DIF and a lower polarization plate LPOL used in a related art technology is removed.

In the LCD according to the related art technology of FIG. 3, a case where the diffusion sheet DIF is simply laminated on the lower polarization plate LPOL of the LCD panel LCP may be taken into consideration. In that case, however, the diffusion sheet DIF does not perform the diffusion function, because the beads BD dispersed on the top surface of the diffusion sheet DIF are buried in the adhesives. As a result, rainbow Mura may occur, which deteriorates picture quality. That is, an embodiment of the present disclosure may not be obtained by simply laminating the diffusion sheet DIF using adhesives as in related art technology.

With reference to FIG. 7, if the diffusion sheet DIF is simply placed under the lower polarization plate LPOL as in a related art technology, the air layers may be present on the upper side of the diffusion sheet DIF. Light incident to the diffusion sheet DIF, from a light source under the diffusion sheet DIF, is refracted at the interface of the beads of the diffusion sheet DIF and meets an air layer, thereby being diffused and condensed. In contrast, with reference to FIG. 8, if the diffusion sheet DIF is simply laminated on the lower polarization plate LPOL, an air layer is not present between the diffusion sheet DIF and the lower polarization plate LPOL. Accordingly, light incident to the diffusion sheet DIF, from a light source under the diffusion sheet DIF, is refracted at the interface of the beads of the diffusion sheet DIF and diffused, but diffused light may not be refracted, diffused, and condensed, because an air layer having a different refractive index is not present. In order to solve such a problem, the LCD according to the first embodiment of the present disclosure may include the air layer Air between the diffusion sheet DIF and the lower polarization plate LPOL by forming the diffusion sheet DIF including the plurality of engraved patterns IPP, such as that shown in FIG. 5.

In the LCD according to the first embodiment of the present disclosure, the lower polarization plate LPOL including the upper protection layer UTAC/polarizer PVA/lower protection layer LTAC has been illustrated as being attached to the lower part of the LCD panel LCP through the adhesive layer AD, but the present disclosure is not limited thereto. The upper protection layer UTAC and the lower protection layer LTAC may be omitted from the lower polarization plate LPOL as shown in FIG. 9, or only the lower protection layer LTAC may be omitted from the lower polarization plate LPOL as shown in FIG. 10.

A method for manufacturing the LCD according to the first embodiment of the present disclosure is described below with reference to FIG. 11.

With reference to FIG. 11, in order to fabricate the diffusion sheet according to the first embodiment of the present disclosure, first, the adhesive layer ADL is formed on a substrate SUB by coating adhesives ADL on the substrate SUB. The substrate SUB on which the adhesive layer ADL has been formed is transferred by a roller, thereby coating beads BD on the adhesive layer ADL. Next, the beads BD are cured by applying heat to the beads BD so that the beads are stuck in the adhesive layer ADL using a hot press HP. Accordingly, a master source material MSM in which the beads BD have been stuck and integrated with the adhesive layer ADL of the substrate SUB is fabricated (portion (a) of FIG. 11).

Next, with reference to portion (b) of FIG. 11, the fabricated master source material MSM is mounted on a first roller, and the base sheet BS is mounted on a second roller. The base sheet BS is transferred by the roller, thereby coating polymer resin on the base sheet BS. The base sheet BS on which the polymer resin has been coated is compressed with the master source material MSM by a compression roller. At this time, a shape of the beads BD in the master source material MSM is compressed on the polymer resin of the base sheet BS, thereby forming the engraved patterns having a shape opposite the shape of the beads BD. Next, the polymer resin in which the engraved patterns have been formed is cured by a UV lamp, thereby fabricating the diffusion sheet DIF including the base sheet BS and the resin layer RL in which the engraved patterns have been formed.

Second Embodiment

Figure 12:
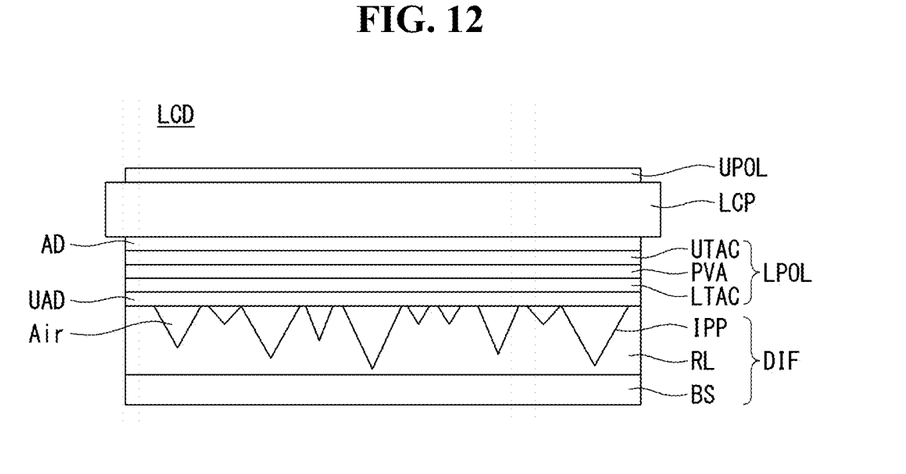
FIG. 12 is a cross-sectional view showing the structure of a liquid crystal display according to a second embodiment of the present disclosure.
Figure 13:
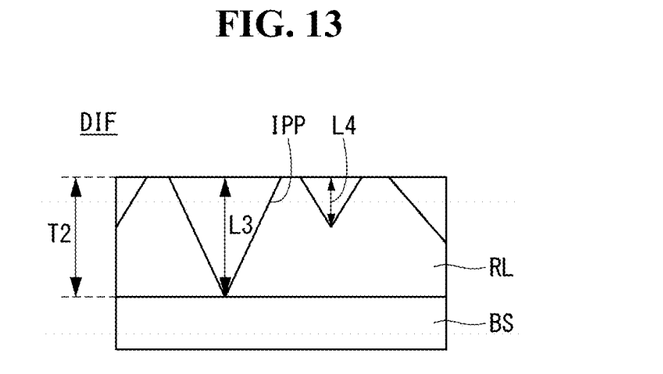
FIG. 13 is a cross-sectional view showing the structure of a diffusion sheet according to the second embodiment of the present disclosure.
Figure 14:
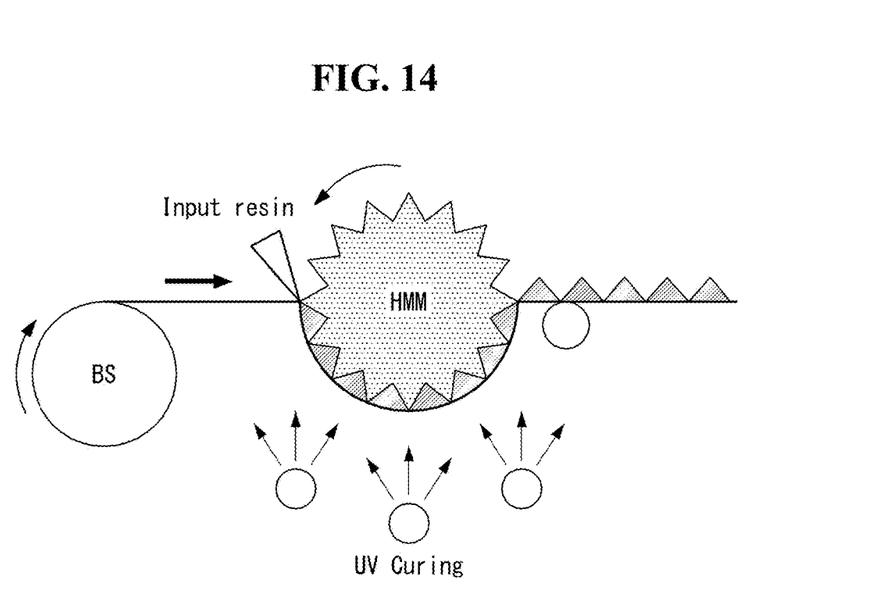
FIG. 14 is a process diagram showing a method for fabricating the liquid crystal display according to the second embodiment of the present disclosure.

An LCD according to a second, example embodiment of the present disclosure is described below with reference to FIGS. 12 to 14. FIG. 12 is a cross-sectional view showing the structure of an LCD according to the second embodiment of the present disclosure. FIG. 13 is a cross-sectional view showing the structure of a diffusion sheet according to the second embodiment of the present disclosure. FIG. 14 is a process diagram showing a method for fabricating the LCD according to the second embodiment of the present disclosure.

With reference to FIG. 12, the LCD according to the second embodiment of the present disclosure includes an LCD panel LCP, an upper polarization plate UPOL, a lower polarization plate LPOL, and a diffusion sheet DIF. The upper polarization plate UPOL has coalesced on the top surface of the LCD panel LCP. The lower polarization plate LPOL on which the diffusion sheet DIF has been laminated has coalesced on the bottom surface of the LCD panel LCP.

The diffusion sheet DIF has been laminated on the lower surface of the lower polarization plate LPOL through an UV adhesive layer UAD. The diffusion sheet DIF includes a resin layer RL having engraved patterns IPP formed on a base sheet BS. In the first embodiment described above, the engraved pattern IPP has been illustrated as having a globular shape having a part of it cut. In contrast, in the second embodiment of the present disclosure, the engraved pattern IPP may have a triangle, for example, a prism shape.

With reference to FIG. 13, the plurality of engraved patterns IPP is formed on a surface of the resin layer RL. Each of the plurality of engraved patterns IPP has a triangular section—for example, a shape opposite the shape of a prism pattern. Each of the plurality of engraved patterns IPP may have a shape similar to the prism pattern of a prism sheet. The plurality of engraved patterns IPP may have various lengths. In this case, the length of the engraved patterns IPP refers to the length of a Y-axis direction that extends in a direction vertical to the LCD panel LCP on the basis of the base sheet BS and the length of an X-axis direction that crosses the Y axis at a right angle. The length of the engraved patterns IPP in the Y-axis direction may be a vertical length from the UV adhesive layer UAD to the resin layer RL, or a vertical length from the UV adhesive layer UAD to the base sheet BS not including the resin layer RL. Each of the lengths L3 and L4 of the engraved pattern IPP may be at least 1 μm or more. For example, each of the lengths L3 and L4 of the engraved pattern IPP may be 1 to 30 μm. If each of the lengths L3 and L4 of the engraved pattern IPP is 1 μm or more, the space in which the air layer Air may be present is formed in the internal space of the engraved pattern IPP. Accordingly, light incident to the resin layer RL meets the air layer Air and is refracted at the interface of the resin layer RL and the engraved pattern IPP, thereby being capable of condensed and diffused. Furthermore, if each of the lengths L3 and L4 of the engraved pattern IPP is 30 μm or less, a thin diffusion sheet DIF may be formed because an increase in the thickness of the resin layer RL may be prevented. Furthermore, the lengths L3 and L4 of contiguous engraved patterns IPP may have a difference of at least 1 μm or more. Accordingly, light-condensing and diffusion effects may be improved because a point of time at which light is condensed and a point of time at which the light is diffused are different.

Furthermore, the plurality of engraved patterns IPP may overlap and may be spaced apart from each other. The plurality of engraved patterns IPP may have a contiguous or non-contiguous pattern. Furthermore, in the plurality of engraved patterns IPP, the depth of a valley may be constant or different in the length direction. Furthermore, the pitch between contiguous engraved patterns IPP may be constant or different. However, the present disclosure is not limited thereto. The engraved patterns IPP having various lengths and shapes may be formed using known methods.

The resin layer RL may have a thickness T2 of 1 to 100 μm in order to facilitate the formation of the plurality of engraved patterns IPP. The thickness T2 of the resin layer RL may be formed to not exceed 100 μm in order to prevent the brightness of a light source from being deteriorated.

With reference back to FIG. 12, the diffusion sheet DIF including the plurality of engraved patterns IPP is laminated on the lower polarization plate LPOL through the UV adhesive layer UAD and integrated with the LCD panel LCP. That is, the LCD having a thinner thickness than a related art LCD may be provided by integrating the diffusion sheet DIF having a diffusion function with the lower polarization plate LPOL. Furthermore, in the LCD according to the second embodiment of the present disclosure, an air layer AIR may be formed between the diffusion sheet DIF and the lower polarization plate LPOL, so light incident from a light source is condensed and diffused. Accordingly, brightness irregularity and a pattern failure attributable to the lamination of the diffusion sheet DIF and the lower polarization plate LPOL may be removed.

With reference to FIG. 14, a method for fabricating the LCD according to the second embodiment of the present disclosure is described below.

With reference to FIG. 14, in order to fabricate the diffusion sheet according to the second embodiment of the present disclosure, first, the base sheet BS is mounted on a roller. The base sheet BS is transferred by the roller, thereby coating polymer resin on the base sheet BS. The base sheet BS on which the polymer resin has been coated is transferred to a compression roller to which a hard mold HMM having prism patterns formed therein has been attached. When the hard mold HMM and the polymer resin of the base sheet BS are compressed by the compression roller, a shape opposite the shape of the prism patterns of the hard mold HMM is formed on the polymer resin. Furthermore, the polymer resin is cured by UV lamps disposed under the compression roller, thereby forming the resin layer. Accordingly, the diffusion sheet DIF, on which the engraved patterns IPP having a shape opposite the shape of the prism patterns have been formed, is formed in the resin layer of the base sheet BS.

Third Embodiment

Figure 15:
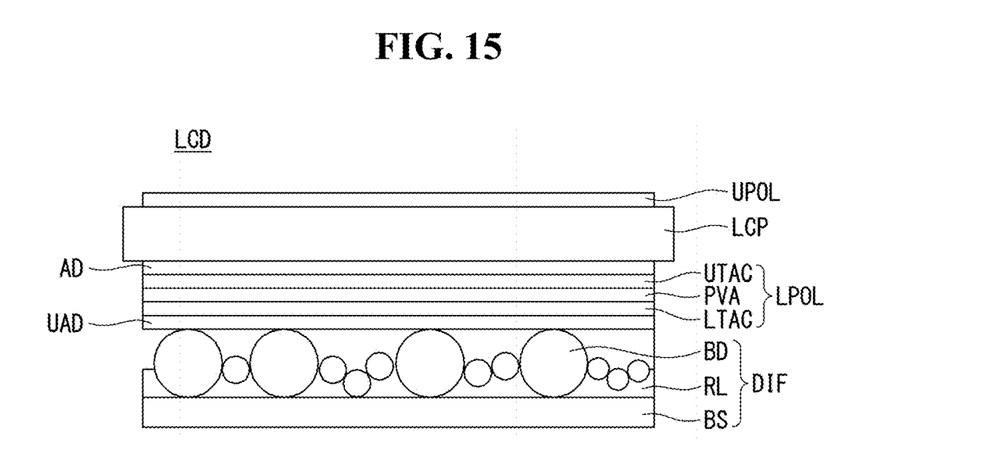
FIG. 15 is a cross-sectional view showing the structure of a liquid crystal display in which a diffusion sheet has been laminated with a lower polarization plate according to a third embodiment of the present disclosure.
Figure 16:
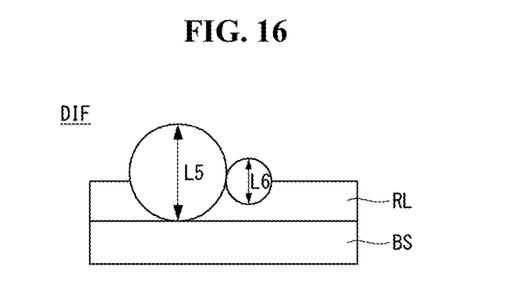
FIG. 16 is a cross-sectional view showing the structure of the diffusion sheet according to the first embodiment of the present disclosure.

An LCD according to a third, example embodiment of the present disclosure is described below with reference to FIGS. 15 and 16. FIG. 15 is a cross-sectional view showing the structure of an LCD in which a diffusion sheet has been laminated with a lower polarization plate according to a third embodiment of the present disclosure. FIG. 16 is a cross-sectional view showing the structure of the diffusion sheet according to the third embodiment of the present disclosure.

With reference to FIG. 15, the LCD according to the third embodiment of the present disclosure includes an LCD panel LCP, an upper polarization plate UPOL, a lower polarization plate LPOL, and a diffusion sheet DIF.

The upper polarization plate UPOL has coalesced on the top surface of the LCD panel LCP. The lower polarization plate LPOL on which the diffusion sheet DIF has been laminated has coalesced on the bottom surface of the LCD panel LCP. The lower polarization plate LPOL includes a polarizer PVA, and an upper protection layer UTAC and a lower protection layer LTAC coalesced on both surfaces of the polarizer PVA. The lower polarization plate LPOL is attached to the LCD panel LCP through an adhesive layer AD.

The diffusion sheet DIF has been laminated on the lower surface of the lower polarization plate LPOL through an UV adhesive layer UAD. The diffusion sheet DIF includes a resin layer RL having a plurality of beads BD formed on a base sheet BS. The resin layer RL is placed on the base sheet BS and may condense and diffuse light incident from a light source by the plurality of beads BD.

With reference to FIG. 16, the resin layer RL includes the plurality of beads BD. In this case, the plurality of beads BD is formed to protrude upward from a surface of the resin layer RL. The reason for this is that a step is formed between the particle diameter L5 or L6 of the bead BD and the thickness T3 of the resin layer RL, so that an air layer Air is present in a space corresponding to the step.

Each of the particle diameters L5 and L6 of the beads BD may be at least 1 μm or more. For example, each of the particle diameters L5 and L6 of the beads BD may be 1 to 30 μm. If each of the particle diameters L5 and L6 of the beads BD is 1 μm or more, the air layer Air may be formed in the space between the beads BD. Accordingly, light incident to the resin layer RL can be refracted at the interface of the resin layer RL and the air layer Air, or the bead BD and the air layer Air, and condensed and diffused. Furthermore, if each of the particle diameters L5 and L6 of the beads BD is 30 μm or less, a thin diffusion sheet DIF can be formed because an increase in the thickness of the resin layer RL is prevented. Furthermore, the lengths L5 and L6 of contiguous beads BD may have a difference of at least 1 μm or more. Accordingly, light-condensing and diffusion effects may be improved because a point of time at which light is condensed and a point of time at which the light is diffused are different. Furthermore, the plurality of beads BD may overlap and may be spaced apart from each other.

The resin layer RL may have a thickness T3 of 1 to 100 μm in order to facilitate the adhesion of the plurality of beads BD to the resin layer RL. The thickness T3 of the resin layer RL is formed to not exceed 100 μm in order to prevent brightness of a light source from being deteriorated.

The beads BD may be one or more selected from the group consisting of polymethylmethacrylate (PMMA), polystyrene, and silicon. 1 to 10 weight % of the beads BD are included in the resin layer RL. If the content of the beads BD is 1 weight % or more with respect to the resin layer RL, there may be an advantage in that a reduction in the diffusion of light incident from a light source, which is attributable to the beads, can be prevented. If the content of the beads BD is 10 weight % or less, there may be an advantage in that the deterioration of brightness of light incident from a light source can be prevented.

The particle diameters of the beads BD dispersed in the resin layer RL may not be uniform, but may have an irregular distribution. Furthermore, the beads BD dispersed in the resin layer RL may not have a regular distribution in the resin layer RL, but may have an irregular distribution.

With reference back to FIG. 15, the diffusion sheet DIF including the plurality of beads BD may be laminated on the lower polarization plate LPOL through the UV adhesive layer UAD and integrated with the LCD panel LCP. That is, the diffusion sheet DIF having a diffusion function may be integrated with the lower polarization plate LPOL, thereby being capable of providing the LCD having a thin thickness compared to a related art technology.

Furthermore, if the diffusion sheet DIF in which the plurality of beads BD has been formed is laminated on the lower polarization plate LPOL as in the third embodiment of the present disclosure, the air layer Air may be formed between the diffusion sheet DIF and the lower polarization plate LPOL. Accordingly, in the LCD according to the third embodiment of the present disclosure, the air layer may be formed between the diffusion sheet DIF and the lower polarization plate LPOL so that light incident from a light source is condensed and diffused. Accordingly, brightness irregularity and a pattern failure, which may occur because the diffusion sheet DIF and the lower polarization plate LPOL are laminated, may be removed.

Figure 17:
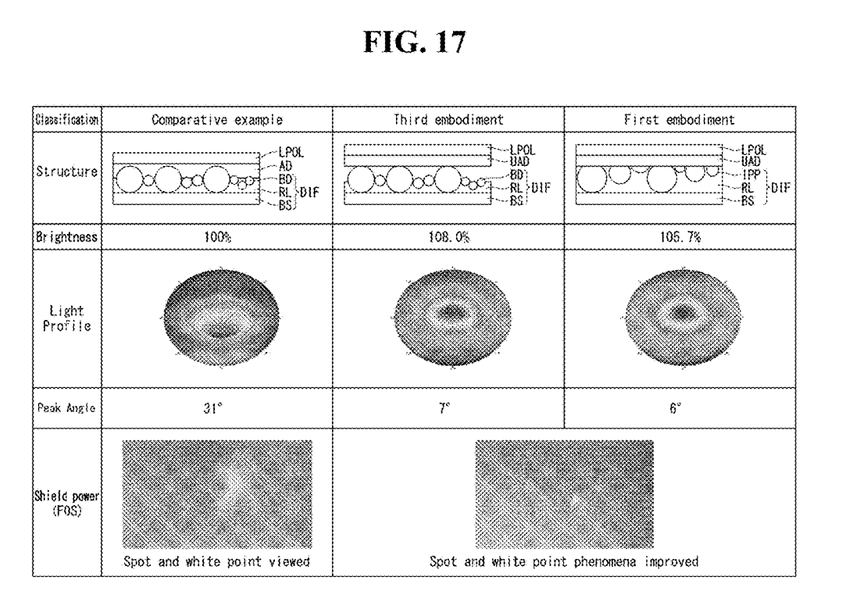
FIG. 17 is a table showing measured brightness, light profiles, peak angles, and shield powers of the liquid crystal displays according to a comparative example and embodiments of the present disclosure.
Figure 18:
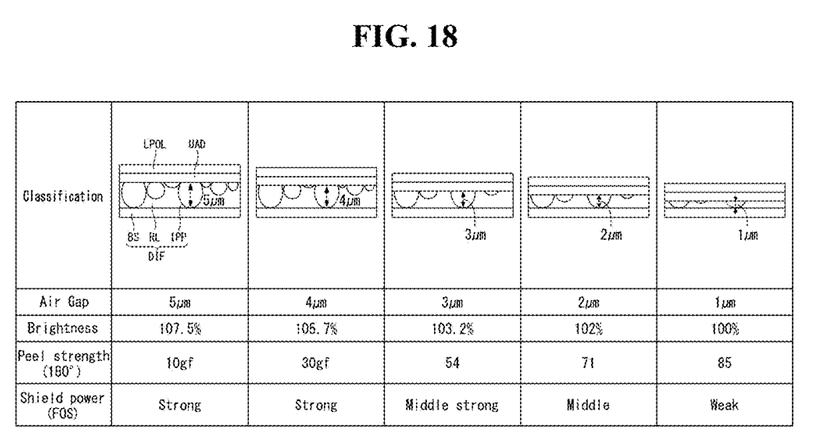
FIG. 18 is a table showing measured brightness, peel strength, and shield powers depending on the gaps of the air layer of the diffusion sheet according to the first embodiment of the present disclosure.

Experimental data regarding the optical characteristics of LCDs according to comparative examples and embodiments of the present disclosure are described below. FIG. 17 is a table showing measured brightness, light profiles, peak angles, and shield powers of the liquid crystal displays according to a comparative example and embodiments of the present disclosure. FIG. 18 is a table showing measured brightness, peel strength, and shield powers depending on the gaps of the air layer of the diffusion sheet according to the first embodiment of the present disclosure.

In FIG. 17, for the LCD according to the comparative example, a diffusion sheet DIF, in which a plurality of beads BD was formed, was fabricated in the resin layer RL of a base sheet BA. The diffusion sheet DIF was laminated on a lower polarization plate LPOL using an adhesive layer AD. In this case, an air layer was not present between the diffusion sheet DIF and the lower polarization plate LPOL. In contrast, the LCD according to the first embodiment shown in FIG. 17 had the same structure as that of FIG. 5, and the LCD according to the third embodiment shown in FIG. 17 had the same structure as that of FIG. 15.

With reference to FIG. 17, the LCD according to the comparative example had a brightness of 100%, a narrow light profile, a peak angle of 31°, and a spot and white point seen in terms of a shield power. In contrast, the LCD according to the first embodiment of the present disclosure had brightness increased by 5.7% compared to the comparative example, a wide light profile, a peak angle of 6°, and a spot and white point phenomenon in terms of a shield power. Furthermore, the LCD according to the second embodiment of the present disclosure had brightness increased by 8% compared to the comparative example, a wide light profile, a peak angle of 7°, and a spot and white point phenomenon in terms of a shield power.

The results show that if the air layer was present, brightness was improved, a light profile was widened, a peak angle was reduced, and a spot and white point phenomenon was improved compared to a case where an air layer was not present between the lower polarization plate LPOL and the diffusion sheet DIF.

With reference to FIG. 18, in the LCD according to the first embodiment of the present disclosure, the air layer within the engraved pattern was formed to have a different average gap of 5, 4, 3, 2, or 1 μm, and corresponding characteristics were checked. It was found that when the average gap of the air layer was 5 μm, brightness was 107.5%, the peel strength was 10 gf, and the shield power was "strong." It was found that when the average gap of the air layer was 4 μm, brightness was 105.7%, the peel strength was 30 gf, and the shield power was "strong." It was found that when the average gap of the air layer was 3 μm, brightness was 103.2%, the peel strength was 54 gf, and the shield power was "middle strong." It was found that when the average gap of the air layer was 2 μm, brightness was 102%, the peel strength was 71 gf, and the shield power was "middle." It was found that when the average gap of the air layer was 1 μm, brightness was 100%, the peel strength was 85 gf, and the shield power was "weak."

The results show that if the average gap of the air layer between the lower polarization plate LPOL and the diffusion sheet DIF was reduced from 5 μm to 1 μm, brightness was decreased from 107.5% to 100%, the peel strength was increased from 10 gf to 85 gf, and the shield power was changed from "strong" to "weak."

Table 1 shows the measured values of brightness of the LCD and the peel strength and shield power of the diffusion sheet depending on a difference between average particle diameters of the beads BD of the diffusion sheet DIF in the LCD according to the third embodiment of FIG. 17. In this case, the depth of the beads inserted into the UV adhesive layer was fixed to 3 μm.

TABLE 1

|  | Difference between average particle diameters of beads | | | |
|---|---|---|---|---|
|  | 5 μm | 10 μm | 15 μm | 20 μm |
| Brightness (%) | 100 | 98.6 | 96.4 | 93.1 |
| Peel strength (180°, gf) | 54 | 23 | 13 | 5 |
| Shield power (FOS) | Middle | Strong | Strong | Strong |

With reference to Table 1, it was found that when a difference between average particle diameters of the beads BD of the diffusion sheet DIF was 5 μm, brightness was 100.0%, the peel strength was 54 gf, and the shield power was "middle." It was found that when a difference between average particle diameters of the beads BD of the diffusion sheet DIF was 10 μm, brightness was 98.6%, the peel strength was 23 gf, and the shield power was "strong." It was found that when a difference between average particle diameters of the beads BD of the diffusion sheet DIF was 15 μm, brightness was 96.4%, the peel strength was 13 gf, and the shield power was "strong." It was found that when a difference between average particle diameters of the beads BD of the diffusion sheet DIF was 20 brightness was 93.1%, the peel strength was 5 gf, and the shield power was "strong."

The results show that if a difference between average particle diameters of the beads BD of the diffusion sheet DIF was increased from 5 μm to 20 μm, brightness was decreased from 100% to 93.1%, the peel strength was reduced from 54 gf to 5 gf, and the shield power was increased from "middle" to "strong."

As described above, the LCD according to an embodiment of the present disclosure has a structure in which in which the diffusion sheet having a diffusion function has surface-coalesced on the lower polarization plate. That is, because the diffusion sheet and the lower polarization plate directly coalesce on the LCD panel, an ultra-thin LCD in which the optical film includes only one sheet of the lower polarization plate may be provided.

Furthermore, because the lower polarization plate is integrated and coalesces under the LCD panel, brightness irregularity and/or brightness patterns, which may occur due to thinness where the engraved patterns or the beads are applied to form the air layer between the lower polarization plate and the diffusion sheet, can be removed.

It will be apparent to those skilled in the art that various modifications and variations can be made in a display device of the present invention without departing from the sprit or scope of the disclosure. Thus, it is intended that the present invention covers the modifications and variations of this disclosure provided they come within the scope of the appended claims and their equivalents.

What is claimed is:

1. A liquid crystal display (LCD), comprising:
an LCD panel;
an upper polarization plate over the LCD panel;
a lower polarization plate adhered under the LCD panel;
an adhesive layer under the lower polarization plate;
a diffusion sheet under the adhesive layer; and
an irregular air layer between at least part of the adhesive layer and the diffusion sheet,
wherein the LCD panel, the lower polarization, the adhesive layer, and the diffusion sheet are integrated by laminating the diffusion sheet to a bottom surface of the lower polarization plate through the adhesive layer, wherein the diffusion sheet includes a base sheet, and a resin layer on the base sheet and configured to have a plurality of engraved patterns, and wherein the length of an interface between the corresponding engraved pattern and the adhesive layer is smaller than a maximum length of the corresponding engraved pattern.

2. The LCD of claim 1, wherein each of the plurality of engraved patterns has a globular shape having an upper part cut at an interface with the adhesive layer.

3. The LCD of claim 1, wherein the air layer is placed within the engraved pattern by an adhesion of the resin layer and the adhesive layer.

4. The LCD of claim 1, wherein at least one of the plurality of engraved patterns has a length of 1 to 30 µm.

5. The LCD of claim 1, wherein a difference between lengths of contiguous engraved patterns of the plurality of engraved patterns is at least 1 µm.

6. The LCD of claim 1, wherein the lower polarization plate comprises at least one polarizer.

7. The LCD of claim 6, wherein the lower polarization plate further comprises a protection layer under or over the polarizer.

8. The LCD of claim 1, wherein a top surface of the resin layer contacting the adhesive layer is flat.

* * * * *